Figures 1, 2:
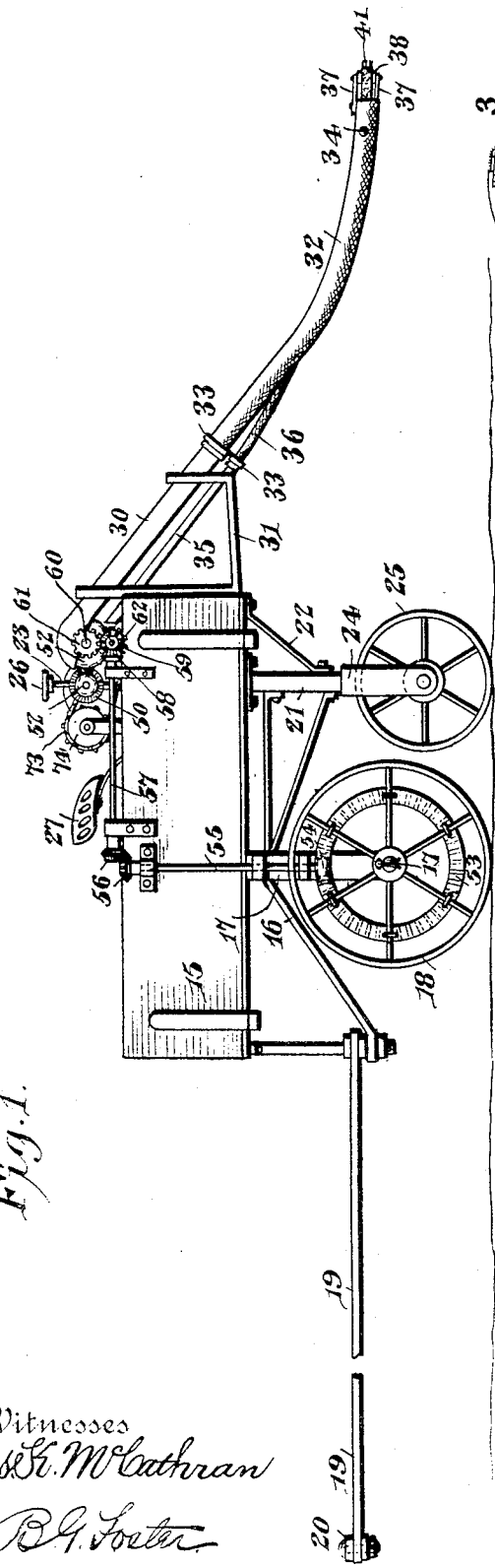

No. 800,627. PATENTED OCT. 3, 1905.
H. P. CHILDRESS.
COTTON PICKING MACHINE.
APPLICATION FILED SEPT. 19, 1904.

4 SHEETS—SHEET 1.

Witnesses
Jas. K. McCathran
B. G. Foster

Henderson P. Childress, Inventor
By C. G. Siggers
Attorney

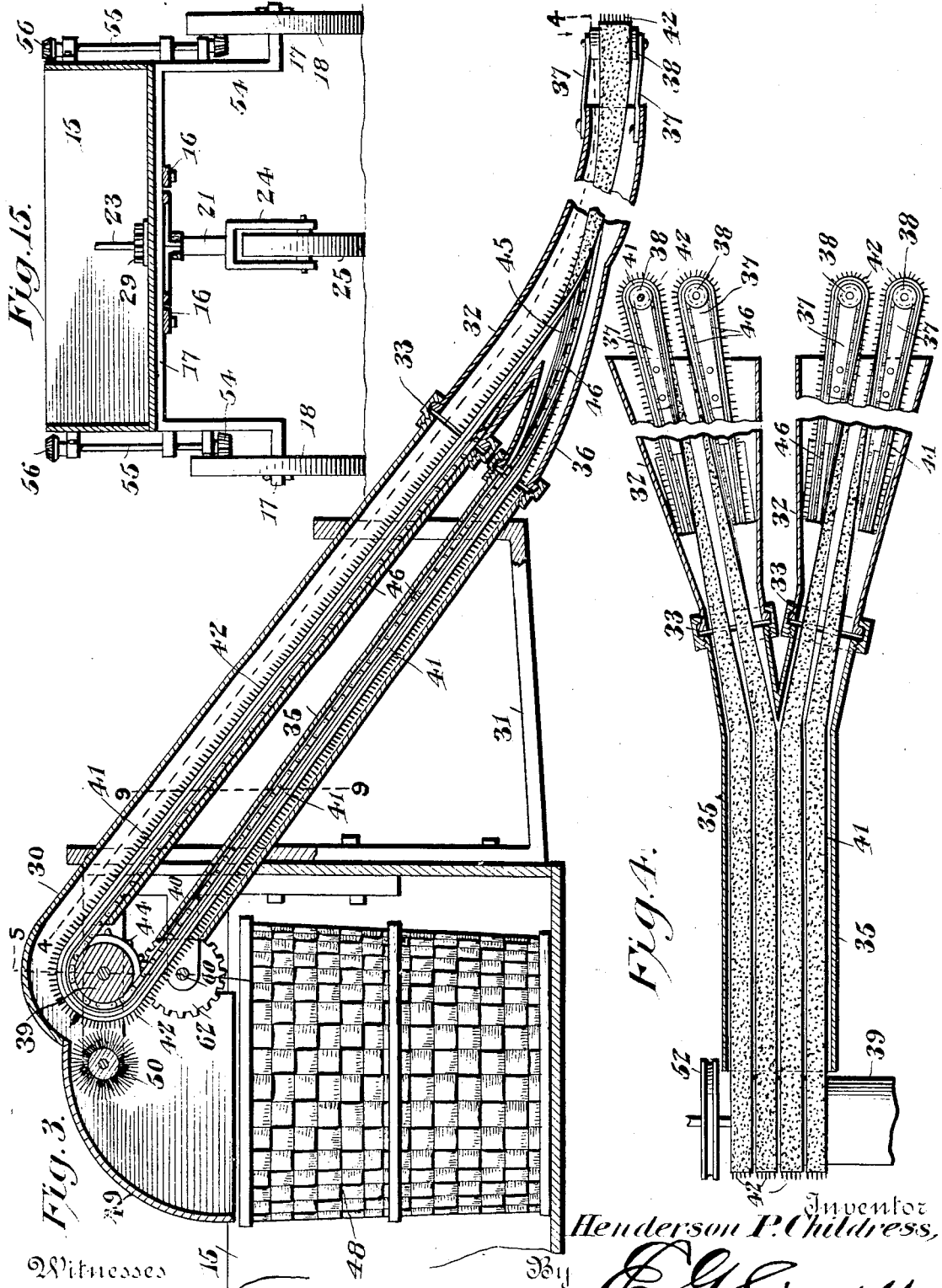

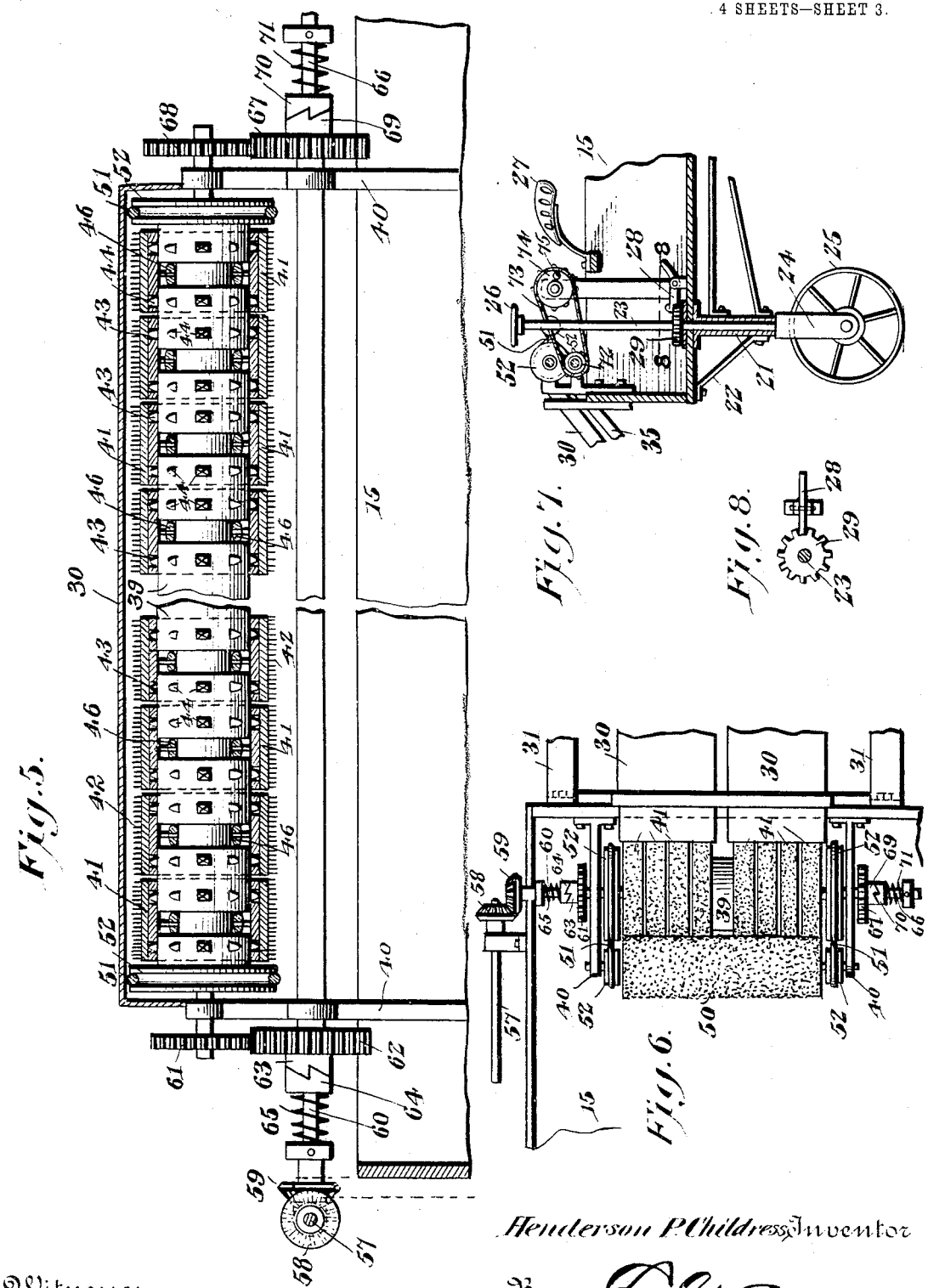

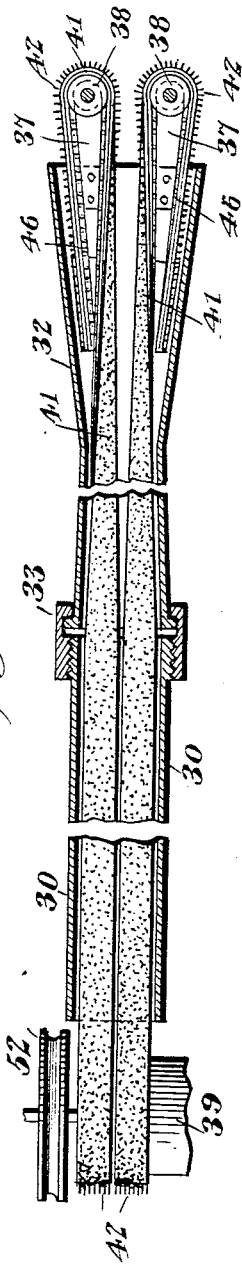

UNITED STATES PATENT OFFICE.

HENDERSON P. CHILDRESS, OF BROOKLYN, NEW YORK.

COTTON-PICKING MACHINE.

No. 800,627.          Specification of Letters Patent.          Patented Oct. 3, 1905.

Application filed September 19, 1904. Serial No. 225,106.

*To all whom it may concern:*

Be it known that I, HENDERSON P. CHILDRESS, a citizen of the United States, residing at Brooklyn, in the county of Kings and State of New York, have invented a new and useful Cotton-Picking Machine, of which the following is a specification.

This invention relates more particularly to that class of machines carried upon a vehicle, though there are undoubtedly certain features clearly adaptable for use in hand-machines carried or moved by the operator.

The object is to provide novel apparatus with which one or more rows of plants may be thoroughly picked with great expedition, said apparatus being constructed of comparatively simple parts and mechanisms.

A further object is to provide for driving the picking mechanism from the wheels of the vehicle and, furthermore, to provide means independent of such wheels so that if the vehicle is brought to a stop—as, for instance, where the cotton is excessively thick—the picking mechanism can still be operated in order that the cotton may all be secured.

The embodiment of the invention which is at present considered preferable is illustrated in the accompanying drawings and is described in the following specification. An inspection of the appended claims will show, however, that the invention is not limited to the exact structure herein set forth, but is open to various changes and modifications.

In the drawings, Figure 1 is a side elevation of the machine. Fig. 2 is a top plan view of the same. Fig. 3 is a sectional view, on an enlarged scale, through a portion of the picking mechanism and taken substantially on the line 3 3 of Fig. 2. Fig. 4 is a sectional view taken on the line 4 4 of Fig. 3. Fig. 5 is a vertical transverse sectional view taken on the line 5 5 of Fig. 3. Fig. 6 is a detail plan view of the rear portion of one of the picking mechanisms. Fig. 7 is a vertical sectional view through the front portion of the vehicle. Fig. 8 is a detail sectional view on the line 8 8 of Fig. 7. Fig. 9 is a cross-sectional view taken on the line 9 9 of Fig. 3. Fig. 10 is a detail sectional view through the rear or rigid section of the tube, showing a portion of one of the guideways. Fig. 11 is a bottom plan view of a portion of one of the belts. Fig. 12 is a similar view with the guide-chain detached. Fig. 13 is a side elevation of a portion of one of the belts. Fig. 14 is a longitudinal sectional view through a slightly-modified form of picker mechanism. Fig. 15 is a cross-sectional view through the vehicle, showing the arched axle, the picking mechanism being removed.

Similar reference characters are employed to designate corresponding parts throughout the drawings.

In the embodiment illustrated a vehicle is employed consisting of a body 15 of sufficient size to contain a plurality of cotton-receiving baskets. The body is supported on an underframe 16, including an arched axle 17, on which are journaled combined supporting and drive wheels 18. The vehicle in the present instance is intended to be moved by a suitable draft-animal, and therefore attaching means for the same are employed, said means consisting of spaced shafts 19, suitably connected at their front ends to the rear portion of the frame 16 and having a movable cross-bar 20 connecting their rear ends. This attaching means thus extends in rear of the vehicle, and the animal hitched thereto will of course be located in a corresponding position. Guiding means for the vehicle is also employed and consists of a depending sleeve 21, located beneath the front of the body and braced by stays 22. In this sleeve is journaled an upright spindle 23, carrying a yoke 24 at its lower end, in which is journaled a guide-wheel 25. The upper end of the stem is provided with a controlling hand-wheel 26, that is arranged in advance of a seat 27, mounted in the vehicle. The spindle 23 is locked against rotation by means of a dog 28, pivoted to the bottom of the body and engaging a rack-wheel 29, secured to the spindle. (Shown in Fig. 7.)

The cotton-picking mechanisms project beyond the front of the vehicle and are preferably constructed as follows: Supporting-tubes are employed, comprising downwardly-inclined rear rigid sections 30, secured to brackets 31, that are fastened to the front of the vehicle and project in advance of the same, flexible sections 32 being coupled, as shown at 33, to the front ends of the rigid sections. The flexible sections are in the form of branches and may be constructed of any material that will permit of being turned readily from side to side, and these sections are preferably provided with handles 34, Casings 35, secured to the brackets 31 below the sections 30, are coupled to the front sections 32 by means of short flexible sleeves 36.

The machine illustrated in the accompanying drawings is particularly intended for operating on two rows of plants, and therefore two sets of picking appliances or mechanisms are employed. These sets are furthermore subdivided into independent mechanisms adapted to be carried by operators located on opposite sides of the row. Thus in Fig. 2 there are shown at the left-hand side of the machine double mechanisms, each employing both hands of the operator, while on the right-hand side of the machine single mechanisms are illustrated, each of which requires but one hand of one of the operators. In view of the fact that the general construction and arrangement of these mechanisms are substantially the same the double mechanisms constituting, in effect, duplicates of the single mechanisms, it is thought that a minute description of one set will be sufficient, and therefore one of the double sets shown on the left-hand side of the machine will be taken as an example.

The front ends of the flexible sections or branches 32 are provided with forwardly-projecting fingers 37, to and between which are journaled spaced parallel rollers 38, said rollers being preferably located in upright positions. A substantially horizontal driving-roller 39 is journaled in rear of the supporting-tube in brackets 40, attached to the front of the vehicle-body. Picker-belts 41 pass longitudinally through the tube and the branches thereof, said belts being arranged in sets. These belts are each provided on one face with projecting cotton-engaging teeth 42, while they have sockets 43 in their inner faces, which sockets receive teeth 44 of the driving-roller 39, the belts all passing about said roller, as illustrated particularly in Figs. 4 and 5. It will thus be seen, particularly by reference to Fig. 4, that the front portions of the belts project slightly beyond the front ends of the tube branches and are disposed in opposing relation, while their rear portions are located edge to edge. The stretches of belts passing through the tubes are of course adapted to move rearwardly, while the return stretches extend through the tubes 35 and connections 36. In order that the belts will always maintain their proper relation and not become displaced because of the twists necessarily formed therein, guiding means are employed, consisting of guideways 45, arranged longitudinally within the rigid and flexible sections 30 and 32 of the tube and engaged by chains 46, carried by the inner sides of the belts, and having flexible stud connections 47 therewith. These guideways are designed particularly for maintaining the endless belts in proper relation with the flexible sections or outer portions 32 when the latter are moved from one position to another while picking cotton. As shown in Figs. 2 and 6, a single driving-roller 39 is employed for the picker-belts that operate upon one row of cotton.

The rear portions of the picker-belts and the driving-roller 39 are located within the front of the body and above the bottom thereof sufficiently to permit the placing of a cotton-receiving basket 48 beneath the same, a hooded cover 49 being located over the basket in rear of the roller. A doffing-brush 50 is located in rear of the driving-roller 39, being journaled in the brackets 40, said brush acting upon the various belts passing over the driving-roller. This brush is driven from the driving-roller by belts 51, passing about pulleys 52, that are respectively connected to the driving-roller and brush. Each set of picking mechanisms is operated from one of the ground-wheels 18, and said wheels are therefore provided with circular racks 53, meshing with pinions 54, carried by the lower ends of upright shafts 55, that are journaled upon the sides of the vehicle. The upper ends of these shafts have beveled gear connections 56 with horizontal counter-shafts 57, having beveled gears 58, meshing with similar gears 59, carried by stub-shafts 60, that are journaled at the outer ends of the driving-rollers 39. Said outer ends of the rollers are provided with gear-wheels 61, meshing with other gear-wheels 62, loosely mounted on the stub-shafts 60 and having clutch members 63, normally engaged by other clutch members 64, slidably mounted on the shafts 60 and revoluble therewith. The clutch members 63 and 64 are ordinarily maintained in operative engagement by means of springs 65, bearing against the sliding members 64.

Between the inner ends of the driving-rollers 39 is located a shaft 66, on which are loosely mounted gear-wheels 67, meshing with other gear-wheels 68, carried by the inner ends of the driving-rollers. The gear-wheels 67 have clutch members 69, coacting with clutch members 70, slidable upon and revoluble with the shaft 66, the said clutch members 70 being normally held in engagement with the clutch members 69 by coiled springs 71. The shaft 66 carries between its ends a sprocket-wheel 72, about which passes a sprocket-chain 73, that also passes around another sprocket-wheel 74, located adjacent to the seat 27, and having a handle 75.

It is believed that the operation of the machine can now be readily understood by those skilled in the art.

As the vehicle is propelled forwardly by a draft-animal hitched behind, the supporting and drive wheels 18 will through their gear connections with the driving-rollers 39, rotate said rollers so as to carry the stretches of the belts passing through the tubes in a rearward direction. Operators upon the ground direct the front ends of the picking devices to the cotton-bolls as the machine progresses, and as soon as the teeth of the projecting portions of the belt engage the lint in said bolls it will be evident that the cotton will be picked therefrom and moved rearwardly, being carried by the belts through the tubes and about the driving-rollers. Here the cotton will be removed by the doffing-brushes and deposited in the baskets beneath the same. Another operator located on the seat of the vehicle directs the movement of the machine and when the baskets are filled removes the same and replaces them by empty baskets, the vehicle being of sufficient size to hold a considerable number of such baskets, as will be evident by reference to Fig. 2. In case the machine reaches a particularly heavy growth of cotton where the same cannot be thoroughly picked while the machine is passing thereby the vehicle is stopped and the operator located on the same, grasping the handle 75, rotates the gear-wheel 74. The shaft 66 will thereupon be clutched to the driving-rollers, and said rollers thus be driven by the operator, effecting the operation of the various picking mechanisms. This movement will be such that the rollers will unclutch from the drive-wheels 18 of the vehicle, and in like manner when the mechanisms are being driven from the wheels the manual operating means is unclutched.

There are many advantages of an important nature secured by means of the structure set forth, among which the following may be enumerated. It will be observed in the first place that the pickers are located entirely in advance of the vehicle, and thus the cotton is picked before said vehicle or the draft-animal disturbs the same. This is a distinct advantage, particularly where the bolls are open, as no cotton will be shaken from the plants before picked. At the same time the vehicle-body is elevated so as to pass freely over the plants. Another advantage resides in the arrangement whereby the cotton is picked from the plants by different operators without interfering with each other. It is thought this will be evident by reference to Fig. 2, wherein the positions of the operators are indicated at A and two rows of cotton by the lines B. It will be observed that the operators picking on each row are simultaneously working at different points, one being in advance of the other, and thus there is no danger of interference, while one will secure that left by the other. By means of the pickers illustrated the cotton may be secured without pulling the bolls or leaves, and the flexible sections are light and easily changed from one position to another, so that they will not be burdensome to the operators. Moreover, the changing of positions and the flexing of the tubes will not interfere with the movement of the belts because of the means for guiding the same. It is also to be noted that the various parts are arranged so that there is nothing to run over and crush the plants. Thus in the structure shown, particularly in Fig. 2, it will be observed that the front or guiding wheel and the draft-animal are located between the rows operated upon, while the ground or driver wheels are arranged outside the same, and that free spaces are left beneath the vehicle to permit the passage of the plants without material interference. It is also to be observed that the mechanism for driving the belts is so disposed that it is under the eye of the operator located on the vehicle and can be readily examined, lubricated, or, if necessary, dismembered for the purpose of repair or renewal.

As already stated, the number of picking mechanism may be varied, as desired, without changing materially the general construction or arrangement of the machine.

Having thus described my invention, what I claim, and desire to secure by Letters Patent, is—

1. A cotton-picking machine, having in combination supporting means, and coacting picker-belts mounted thereon and having cotton-engaging faces, said belts having portions of said faces disposed opposite to each other and having other portions of said faces arranged in substantially the same plane.

2. In a cotton-picking machine, the combination with a support, of coacting picker-belts having portions located at the front end of the support and provided with cotton engaging and carrying surfaces disposed opposite each other, said belts having their rear portions arranged substantially edge to edge and their faces in substantially the same plane.

3. In a cotton-picking machine, the combination with a supporting-tube, of coacting picker-belts movably mounted in the tube and extending beyond the front end of the same, said extended portions having cotton-engaging faces that are opposite each other, and the rear portions of the belts located in the tube being arranged substantially edge to edge with said faces in substantially the same plane.

4. In a cotton-picking machine, the combination with a supporting-tube having a flexible front section, of belts operating through the tube and extending beyond the front end of the same, said extended portions having certain of their faces disposed opposite each other and the rear portions of the belts being arranged substantially edge to edge.

5. In a cotton-picking machine, the combination with a support having guideways, of separate cotton-picking belts located longitudinally of the support, said belts having cotton-engaging faces, certain portions of which are disposed opposite each other and other portions of said belts being located edge to edge with their faces in substantially the same plane, and guides carried by the belts and engaging in the guideways.

6. In a cotton-picking machine, the combination with a supporting-tube having a flexible front section, said tube being provided with longitudinally-disposed guideways on its inner side, separate belts passing longitudinally through the tube, and devices carried by the belt and engaging in the guideways.

7. In a cotton-picking machine, the combination with a bracket, of a supporting-tube comprising a rigid section secured to the bracket and a flexible section projecting in front of the bracket, spaced rollers journaled on the front end of the tube, guideways located longitudinally within the tube, endless belts having projecting picker-teeth, said belts passing through the tube and about the rollers, and guides carried by the belts and engaging in the guideways, said belts having the picker-teeth at their front portions disposed in opposing relation and said belts having their rear portions edge to edge.

8. In a cotton-picking machine, the combination with a driving-roller, of a plurality of picker-belts having cotton-engaging faces, certain of said faces being disposed opposite each other, said belts passing about the driving-roller with the faces in substantially the same plane.

9. In a cotton-picking machine, the combination with a support, of a driving-roller journaled at the rear end of the same, and cotton-picking belts passing over the roller and having cotton-engaging faces provided with teeth, the portions of said faces located at the front end of the support being disposed with the teeth of said faces projecting toward each other and the portions passing about the rollers having their teeth projecting in substantially the same direction.

10. In a cotton-picking machine, the combination with a supporting-tube, of a driving-roller journaled in rear thereof, spaced rollers located at the front end of the tube, and endless belts passing about the spaced rollers and about the driving-roller.

11. In a cotton-picking machine, the combination with a supporting-tube, of a horizontally-disposed roller located at the rear of the same, spaced upright rollers located at the front end of the tube, and picker-belts passing about the rear roller and about the upright front rollers.

12. In a cotton-picking machine, the combination with a supporting-tube having a flexible front section, of belts operating through the tube and having certain of their faces disposed opposite each other and provided with cotton-engaging teeth.

13. In a cotton-picking machine, the combination with a tubular support having branches, of cotton-picking belts extending through the support and its branches, and a doffing device located at the rear end of the tubular support for removing the cotton from the various belts.

14. In a cotton-picking machine, the combination with a plurality of separate tubular supports arranged side by side, of cotton-picking belts extending through the supports and arranged to engage the cotton at the front ends thereof, and a common doffing-brush located at the rear ends of the supports for removing the cotton from the various belts.

15. In a cotton-picking machine, the combination with a plurality of tubular supports having their rear portions located side by side and provided with branches at their front portions, of a roller located at the rear ends of the supports, a plurality of cotton-picking belts extending through the supports and their various branches, and doffing means for removing the cotton from the belts as the same pass about the roller.

16. In a cotton-picking machine, the combination with a supporting-tube, of spaced substantially parallel rollers located at the front of the same, a roller located at the rear of the tube, a plurality of belts passing about the rear roller and about the parallel front rollers, and a rotary doffing-brush located adjacent to the rear roller and coacting with the belts passing about the same.

17. In a cotton-picking machine, the combination with a tubular support having forwardly-projecting branches, of a roller located in rear of the support, and picker-belts passing about the roller and extending respectively longitudinally of the branches, said belts having cotton picking and carrying faces projecting beyond the front ends of the branches.

18. In a cotton-picking machine, the combination with a supporting-tube having forwardly-projecting branches, of a roller journaled at the rear of the tube, and a set of picker-belts passing through each branch and about the roller.

19. In a cotton-picking machine, the combination with a wheeled vehicle, of cotton-picking mechanism mounted thereon and driven from the wheels thereof, said mechanism including tubes that project in advance of the vehicle and endless picker-belts operating through the tubes, and animal draft devices connected to the rear of the vehicle and extending in rear of the same.

20. In a cotton-picking machine, the combination with a vehicle including a body of sufficient size to receive a plurality of cotton-receiving baskets, of animal draft appliances connected with the rear of the vehicle and extending in rear of the same, cotton-picking devices mounted on the front of the vehicle and projecting in advance thereof, driving and supporting wheels for the vehicle, driving means for the picking devices, said means extending transversely of the vehicle and located on the front of the same, and clutch connections between the driving-wheels of the vehicle and said driving means.

21. In a cotton-picking machine, the combination with a vehicle including a body, supporting and driving wheels, and animal draft appliances located behind and connected with the rear of said body, of cotton-picking mechanism projecting from the front of the vehicle, a seat located on the body, steering means comprising a ground-wheel and a steering-wheel connected thereto and located in advance of the seat at the front of the vehicle-body, and driving mechanism for the cotton-picking devices extending transversely of the body in advance of the seat and having connections with the driving-wheels of the vehicle.

22. In a cotton-picking machine, the combination with a vehicle having ground-wheels, of cotton-picking mechanism, operating means for the picking mechanism connected to and driven by the ground-wheels, and manually-operated means located on the vehicle and also connected with the picking mechanism for operating said mechanism when said vehicle is at a standstill.

23. In a cotton-picking machine, the combination with a vehicle having a driving-wheel, of cotton-picking mechanism including operating means, a clutch connection between the driving-wheel and operating means of the picking mechanism, and manually-operated means for the picking mechanism having a clutch connection with the operating means of said picking mechanism.

24. In a cotton-picking machine, the combination with a vehicle having a drive-wheel, of cotton-picking mechanism, driving connections between the drive-wheel and cotton-picking mechanism including a spring-clutch, a manually-operated device mounted on the vehicle, and driving connections between said manually-operated device and the cotton-picking mechanism, said latter connections including a spring-clutch.

25. In a cotton-picking machine, the combination with a vehicle, of a drive-wheel mounted thereon, cotton-picking mechanism including a drive-roller and a plurality of belts passing thereover, connections between the drive wheel and roller including a clutch, a rotatable manually-operated device mounted on the vehicle, and connections between said device and the roller including a clutch.

26. In a cotton-picking machine, the combination with a vehicle, of a supporting-tube extending therefrom, a plurality of picker-belts operating through the tube, a roller located in rear of the tube, said belts passing about the roller, a seat mounted on the vehicle, steering apparatus for the vehicle including controlling means located adjacent to the seat, and operating means for the roller including a manually-operated device disposed adjacent to the seat.

27. In a cotton-picking machine, the combination with a vehicle, of means for attaching a draft-animal to the rear of the same, a plurality of tubes projecting from the front of the vehicle, a roller located in rear of the tubes, sets of rollers arranged at the front ends of the tubes, a plurality of belts operating through the tubes, said belts extending about the front rollers and about the rear roller, supporting-wheels for the vehicle, and gearing connecting one of the supporting-wheels and the roller.

28. In a cotton-picking machine, the combination with a vehicle-body, of an arched axle, wheels journaled on the axle, downwardly-inclined tubes projecting from the front of the vehicle-body and having flexible front ends, belts operating through the tubes, and operating means for the belts driven from the wheels.

29. In a cotton-picking machine, the combination of a flexible tube, separate cotton-picking belts passing through the tube and having cotton engaging and carrying portions, and means for guiding the belts in the tube for maintaining the said belts in proper relation to the tube as the latter is moved from one position to another.

30. In a cotton-picking machine, the combination with a flexible supporting-tube having guideways, of separate cotton-picking belts passing through the tube and having cotton engaging and carrying portions, and devices carried by the belts for engaging the guideways.

31. In a cotton-picking machine, the combination of a supporting-tube having rigid and flexible sections provided with guideways, separate cotton-picking belts passing through the guideways and having cotton engaging and carrying faces, and means carried by the belts for engaging the guideways.

32. In a cotton-picking machine, the combination with a tube having branches, of cotton-picking belts passing through the tubes and branches and having cotton engaging and carrying faces, and means located at the rear end of the tube for operating the belts.

33. In a cotton-picking machine, the combination with a tube having branches, of a roller located at the rear end of the tube, cotton-picking belts passing about the roller and extending through the tube and its branches, said belts having cotton engaging and carrying means, and means for rotating the roller.

34. In a cotton-picking machine, the combination with a plurality of tubes having rear portions arranged side by side, of a roller located transversely of the rear ends of the tubes, cotton-picking belts passing through the tubes and having cotton engaging and carrying means, said belts passing about the roller, and means for rotating the roller.

35. In a cotton-picking machine, the combination with a plurality of tubes having their rear portions arranged side by side and having their front portions provided with flexible branches, of a roller located transversely of the rear ends of the tubes, and cotton-picking belts passing about the roller and extending through the tubes and their branches, said belts being provided with cotton engaging and carrying means.

36. In a cotton-picking machine, the combination with a tube having a rear substantially rigid section and a front flexible section, of cotton picking and carrying mechanism, including a belt passing through the tube and arranged to engage the cotton at the front end of the flexible section, and means for operating the belt.

37. In a cotton-picking machine, the combination with a tube having a rear substantially rigid section and a front flexible section, of cotton picking and carrying mechanism, including a belt passing through the tube and arranged to engage the cotton at the front end of the flexible section, and means located at the rear end of the rigid section for operating the belt.

38. In a cotton-picking machine, the combination with a tube having a rear substantially rigid section and flexible branches connected to the front end of said rigid section, of cotton-picking belts passing through the rigid section and through the flexible branches and arranged to engage the cotton at the front ends of said flexible branches, and common means for operating the belts.

39. In a cotton-picking machine, the combination with a vehicle, of a supporting member comprising a substantially rigid section mounted thereon and a flexible section connected to the front end of the rigid section, cotton picking and carrying mechanism, including a belt passing through both sections, and means mounted on the vehicle for driving the belt and removing the cotton therefrom.

40. In a cotton-picking machine, the combination with a vehicle, of brackets secured to the front portions thereof, tube-sections secured to the brackets, flexible sections secured to the front ends of said secured sections, cotton picking and carrying mechanism, including belts passing through the sections, and means located on the vehicle for driving the belts and removing the cotton therefrom.

41. In a cotton-picking machine, the combination with a flexible manually-directed support, of cotton picking and carrying mechanism, including a belt operating longitudinally thereof and flexing with said support.

42. In a cotton-picking machine, the combination with a flexible manually-directed supporting-tube, of cotton picking and carrying mechanism, including a belt operating longitudinally through said tube and flexing therewith.

43. In a cotton-picking machine, the combination with a flexible manually-directed support, of cotton picking and carrying mechanism, including a belt operating longitudinally thereof and flexing with said support, and guiding means for said belt mounted on said support and permitting the flexing movement of the support and belt.

44. In a cotton-picking machine, the combination with a flexible manually-directed supporting-tube, of cotton picking and carrying mechanism, including a belt operating longitudinally through the tube and flexing therewith, and guides for said belt mounted in the tube and permitting the flexing movement thereof and of the belt.

45. In a cotton-picking machine, the combination with a vehicle, of cotton-picking mechanism mounted thereon, said mechanism comprising flexible manually-directed supports mounted on and projecting in advance of the vehicle, and picking and carrying mechanism, including belts movably mounted on the supports and flexing therewith.

46. In a cotton-picking machine, the combination with a vehicle, of cotton-picking mechanism mounted thereon, said mechanism comprising a plurality of flexible manually-directed supports mounted on and projecting in advance of the vehicle, picking and carrying mechanism including belts movably mounted on the supports and flexing therewith, and means located on the vehicle for driving the belts.

47. In a cotton-picking machine, the combination with a vehicle, of cotton-picking mechanism mounted thereon, said mechanism comprising a plurality of flexible manually-directed supports mounted on and projecting in advance of the vehicle, and combined cotton picking and carrying means movably mounted on the supports and extending longitudinally of the same, different portions of said means assuming different angular relations when the supports are flexed, and means located on the vehicle for driving the picking and carrying means.

48. In a cotton-picking machine, cotton-picking mechanism including a conduit comprising yieldingly-connected sections, and cotton picking and conducting means movably mounted on both sections.

49. In a cotton-picking machine, cotton-picking mechanism including a conduit comprising yieldingly-connected sections, and cotton picking and conducting mechanism including belting passing therethrough.

50. In a cotton-picking machine, cotton-picking mechanism including a conduit comprising tube-sections, yielding means connecting the tube-sections, and cotton picking and conducting mechanism including belting passing through the conduit.

51. In a cotton-picking machine, the combination with a carrier, of a manually-directed support associated with the carrier and comprising jointed relatively movable sections, and cotton picking and carrying means mounted on the sections.

In testimony that I claim the foregoing as my own I have hereto affixed my signature in the presence of two witnesses.

HENDERSON P. CHILDRESS.

Witnesses:
 C. P. HAMILTON,
 CHARLES E. ALDRIDGE.